United States Patent [19]
Kobayashi et al.

[11] Patent Number: 5,251,105
[45] Date of Patent: Oct. 5, 1993

[54] PORTABLE ELECTRONIC APPARATUS HAVING A BATTERY PACK WITH A MECHANISM FOR LATCHING AND AN INDEPENDENT MECHANISM FOR TEMPORARILY PREVENTING DETACHMENT

[75] Inventors: Takaichi Kobayashi; Mitsuhiro Yoshida, both of Tokyo, Japan

[73] Assignee: Kabushiki Kaisha Toshiba, Kawasaki, Japan

[21] Appl. No.: 972,719

[22] Filed: Nov. 6, 1992

Related U.S. Application Data

[63] Continuation of Ser. No. 717,837, Jun. 21, 1991, abandoned.

[30] Foreign Application Priority Data

Jun. 25, 1990 [JP] Japan ................... 2-166221

[51] Int. Cl.$^5$ ............... H05K 7/10; G06F 1/16
[52] U.S. Cl. ................. 361/683; 200/51.09; 320/2; 320/15; 361/680; 361/736
[58] Field of Search ............... 429/96–100; 364/708; 361/380, 390–395, 399, 412, 415, 429; 200/50 R, 61.59, 51.09; D13/103; 206/1.5; 292/226, 228, DIG. 31, DIG. 38; 220/324, 326, 329, 346; 320/2, 15; 307/150

[56] References Cited

U.S. PATENT DOCUMENTS

| | | | |
|---|---|---|---|
| 3,897,268 | 7/1975 | Haraguchi | 429/97 |
| 3,999,110 | 12/1976 | Rainstrom et al. | 429/96 X |
| 4,146,682 | 3/1979 | Nakao | 429/97 |
| 4,315,162 | 2/1982 | Ferguson . | |
| 4,515,872 | 5/1985 | Okano | 429/123 X |
| 4,629,962 | 12/1986 | Arakawa | 429/98 X |
| 4,636,703 | 1/1987 | Tohya et al. | 429/99 X |
| 4,690,878 | 9/1987 | Nakamara | 429/97 X |
| 4,746,852 | 5/1988 | Martin . | |
| 4,752,539 | 6/1988 | Vatter | 429/97 X |
| 4,828,944 | 5/1989 | Yabe et al. | 429/97 |
| 4,849,682 | 7/1989 | Bauer et al. . | |
| 4,871,629 | 10/1989 | Bunyea | 429/97 |
| 4,903,222 | 2/1990 | Carter et al. | 364/708 |
| 4,904,549 | 2/1990 | Goodwin et al. | 429/97 |
| 4,908,790 | 3/1990 | Little et al. . | |
| 4,931,369 | 6/1990 | Hardt et al. | 429/123 X |
| 4,943,498 | 7/1990 | Cooper et al. | 429/97 |

FOREIGN PATENT DOCUMENTS

| | | |
|---|---|---|
| 0293664 | 12/1988 | European Pat. Off. . |
| 0340794 | 11/1989 | European Pat. Off. . |
| 0392857 | 10/1990 | European Pat. Off. . |
| 0394074 | 10/1990 | European Pat. Off. . |
| 0404588 | 12/1990 | European Pat. Off. . |
| 64-54369 | 4/1989 | Japan . |
| 2085219 | 4/1982 | United Kingdom ........... 429/123 |
| 2219151 | 11/1989 | United Kingdom . |

OTHER PUBLICATIONS

Toshiba T1600 Portable Personal Computer User's Manual, pp. i, 2–1 through 2–7, 4–20 through 4–26, copyright 1988.

Primary Examiner—Leo P. Picard
Assistant Examiner—Michael W. Phillips
Attorney, Agent, or Firm—Cushman, Darby & Cushman

[57] ABSTRACT

A pocket computer includes a base body having a battery pack storage area with an access opening section defined in the peripheral wall. A battery pack is loaded and unloaded into and out of the battery pack storage area. The battery pack has electrodes and an engaging section provided at its lower wall. Contacts 31 are provided in the battery pack storage area in a manner to contact with the electrodes of the battery pack and to impart a force to the battery pack in a direction to push the battery pack toward the access opening section. Engaging members are provided in the bottom wall of the battery pack storage area to be latched and unlatched to and from the associated engaging section of the battery pack 25. A projection and holding member are provided on the battery pack storage area and battery pack, respectively, to hold the battery pack in the battery pack storage area and release the holding of the battery pack in the battery pack storage area.

25 Claims, 8 Drawing Sheets

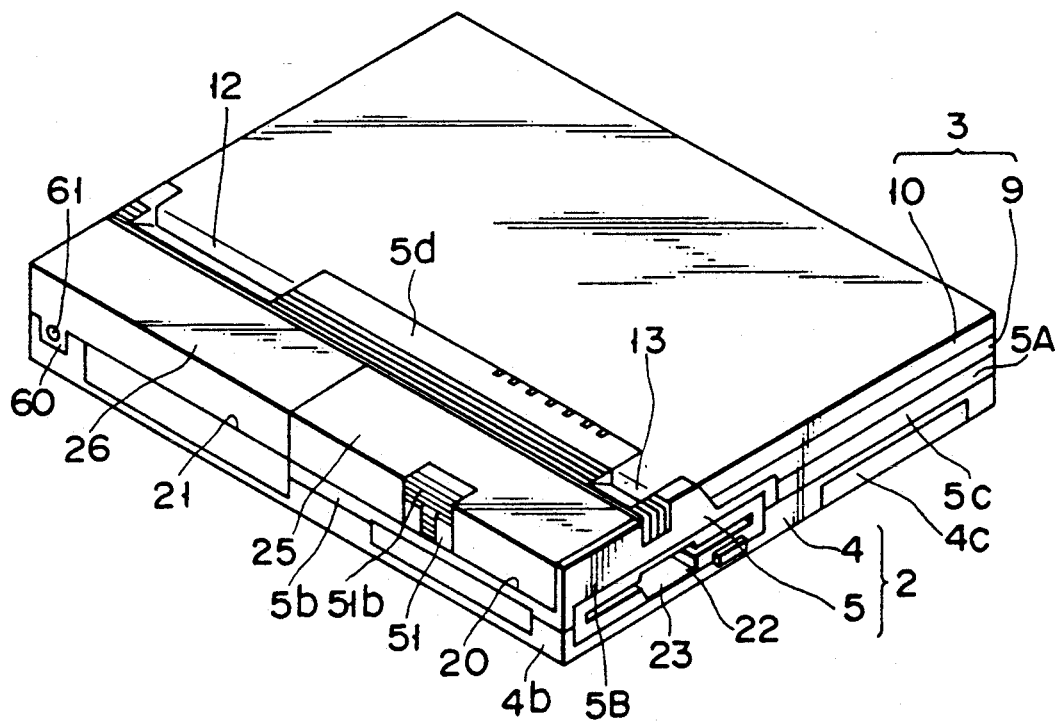
F I G. 2

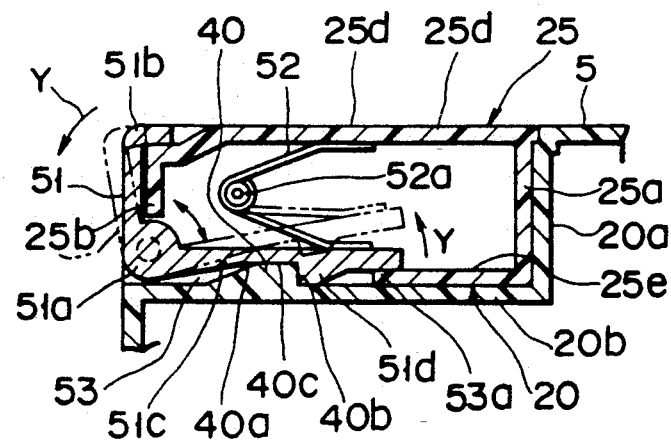
F I G. 11
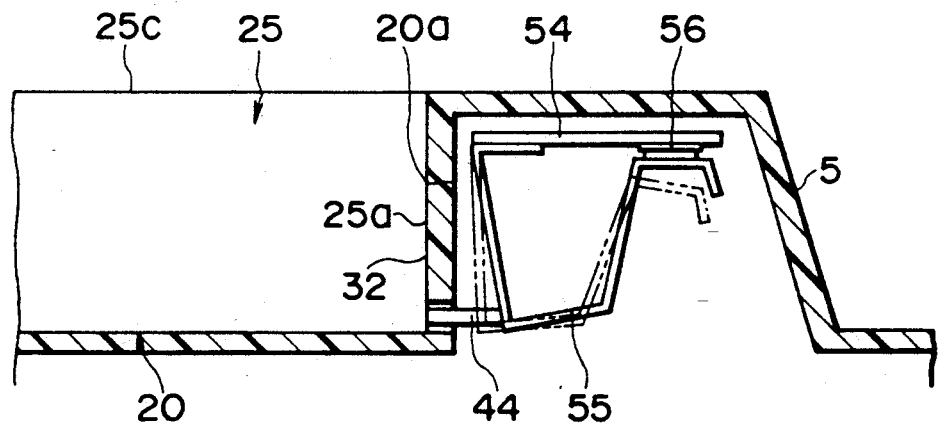
F I G. 12

PORTABLE ELECTRONIC APPARATUS HAVING A BATTERY PACK WITH A MECHANISM FOR LATCHING AND AN INDEPENDENT MECHANISM FOR TEMPORARILY PREVENTING DETACHMENT

This is a continuation of application Ser. No. 07/717,837, filed on Jun. 21, 1991, now abandoned.

BACKGROUND OF THE INVENTION

Field of the Invention

The present invention relates to a portable electronic apparatus, such as a lap-top computer and word processor, and in particular to a structure for mounting, in a base body of an apparatus, a battery pack for use as a power supply for drive.

Description of the Related Art

Recently, a lap-top type computer and word processor have widely been employed which include a keyboard and flat-panel type display.

This type of portable electronic apparatus has a base body equipped with a keyboard and a display housing rotatably mounted on the base body. The display housing is rotatable to a closed position where the keyboard is covered.

In order to make the apparatus a thinner, hand-held one, a battery pack has been employed as its power supply.

The battery pack is detachably mounted in the base body of the apparatus, that is, it is loaded into the base body when being used as a power supply and unloaded out of the base body when being recharged. In order to allow the battery pack to be loaded into the base body, a battery pack storage area is provided at the rear portion or side portion of the base body. In this case, the rear portion or side portion of the base body at the battery pack storage area is opened as a battery pack access opening. The battery pack is loaded and unloaded into and out of the battery pack storage area via the rear or side access opening section of the base body.

Conventionally, in order to connect the battery pack to a circuit board in the base body, electrodes are provided in the lower wall of the battery pack storage area and, when the battery pack is loaded into the battery pack storage area, contacts provided in the battery pack storage area are connected to the associated electrodes.

A means for holding the battery pack in the battery pack storage area and releasing such a holding state is provided on the battery pack storage area and the battery pack.

In the electronic apparatus, a floppy disc (magnetic disc) is employed as a medium for reserving and calling information.

A drive is employed to drive the floppy disc. This floppy disc driving device rotates the floppy disc and records and playbacks information on and from the floppy disc by a magnetic hard.

Recently, in a battery pack-equipped portable electronic apparatus using such a floppy disc, studies have been made on how to mount a floppy disc driving device at a location beneath the battery pack storage area in the base body.

However, with the floppy disc driving device so mounted in the base body, the contacts making contact with the electrodes of the battery pack and the floppy disc driving device are overlappingly arranged beneath the battery pack storage area of the base body, making thicker the lower area of the battery pack storage area in the base body and hence the base body.

In order to avoid this problem, it may be considered that electrodes are provided in the front wall or side wall of the battery pack and contacts are provided in the front wall or side wall of the peripheral wall of the battery pack storage area in the base body. By so doing, a floppy disc driving device only can be provided beneath the lower wall of the battery pack storage area without providing contacts there.

In such an arrangement, however, when the contacts of the battery pack storage area make contact with the electrodes of the battery pack, a force acts upon the battery pack sometimes in a direction to push the battery pack away from the battery pack storage area.

This arrangement poses the following problem in the detachment of the battery pack from the battery pack storage area.

That is, the battery pack is held by a holding means in the battery pack storage area and, when the battery pack is removed from the battery pack storage area, such a holding state is released by a manual operation. At this time, the battery pack may slip out of the battery pack storage area upon being pushed back by a pushing force from the contacts and the so pushed-back battery pack falls out of the base body and is broken.

SUMMARY OF THE INVENTION

It is accordingly the object of the present invention to provide a portable electronic apparatus which, when the holding of a battery pack by a holding means in a battery pack storage area is released, can prevent a slippage of the battery pack from the battery pack storage area.

According to the present invention, there is provided a portable electronic apparatus comprising:

a base body having a peripheral wall having a front wall, a rear wall and a pair of side walls and an upper wall, the base body having a battery pack storage area including an access opening section formed at the peripheral wall and, the battery pack storage area having a peripheral wall comprised of a front wall and side walls;

a battery pack having a peripheral wall comprised of a front wall, a rear wall and a pair of side walls, an upper wall and a lower wall, and detachably loaded into the battery pack storage area via the access opening section, the battery pack having engaging sections;

electrodes provided in the battery pack storage area and making contact with the electrodes of the battery pack;

engaging members provided at the lower wall of the battery pack storage area and adapted to be latched and unlatched to and from the engaging sections of the battery pack; and holding means, provided on the battery pack storage area and battery pack, for holding the battery pack in the battery pack storage area and releasing the holding of the battery pack in the battery pack storage area.

According to the present invention, the battery pack is held by the holding means in the battery pack storage area in the base body. The battery pack is held engagement between the engaging sections on the lower wall of the battery pack and the engaging members in the bottom wall of the battery pack storage area. For this reason, even if the aforementioned holding state is released, the battery pack is held in a storage area.

Even if, therefore, the contacts provided in the battery pack storage area make contact with the electrodes in the battery pack and a force acts upon the battery pack in a direction to push the battery pack away from the battery pack storage area via the access opening, the battery pack is prevented from slipping out of the battery pack storage area.

The engaging member provided on the battery pack storage area can constitute part of the bottom wall of the battery pack storage area, obviating the necessity of utilizing an extra spacing in the base body at an area beneath the lower wall of the battery pack storage area. It is, therefore, possible to provide a floppy disc drive beneath the battery pack storage area in the base body without making the base body thicker.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a perspective view showing the portable computer with a display housing rotated to a closed position where a keyboard is closed;

FIG. 11 is a cross-sectional view showing a holding member; and

FIG. 12 is a view showing a means for switching a circuit mode of a circuit board.

DETAILED DESCRIPTION OF THE PREFERRED EMBODIMENTS

Figure 1:
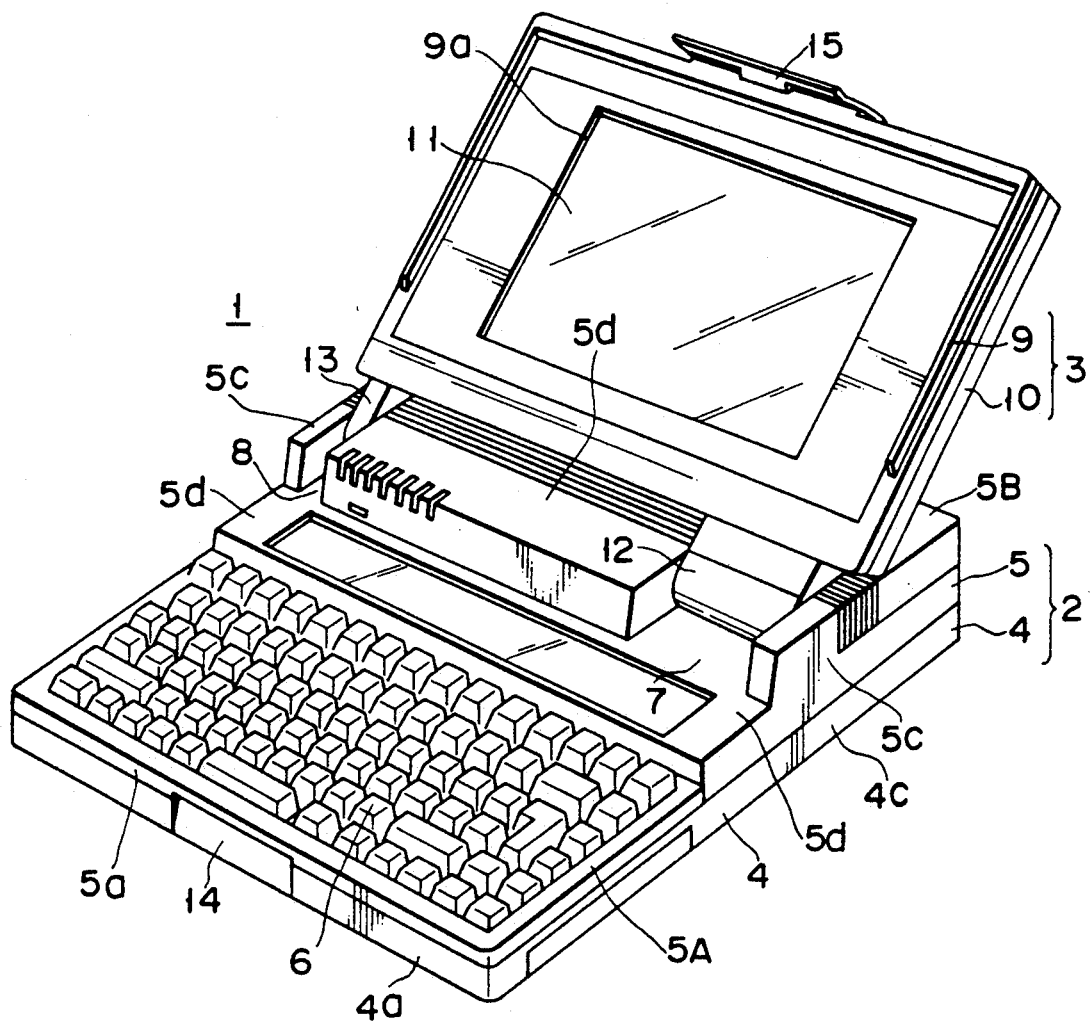
FIG. 1 is a perspective view showing a portable computer of the present invention.

FIGS. 1 and 2 disclose a lap-top type portable computer 1.

The portable computer 1 includes a box-like base body 2 and a display housing 3 of flat panel type. The base body 2 comprises a bottom case 4 and a top cover 5. A circuit board, not shown, is provided within the base body and circuit component parts, not shown, are mounted on the circuit board.

The bottom case 4 has a lower wall, not shown, a front wall 4a merging with the lower wall, a rear wall 4b merging with the lower wall, and a pair of side walls 4c, right and left, with which the lower wall and front and rear walls 4a and 4b are sandwiched.

The top cover 5 has a front wall 5a, a rear wall 5b, a pair of side walls 5c, right and left, with which the front and rear walls 5a and 5b are sandwiched, and an upper wall 5d merging with the front wall 5a, rear wall 5b and side wall 5c. The top cover 5 is comprised of front and back portions 5A and 5B. The front portion 5A of the top cover 5 has an open top wall where a keyboard 6 is mounted. A pair of connecting section 7, 8 are provided on the upper wall 5d of the top cover 5 to support a display housing 3.

The upper wall 5d of the top cover 5 constitutes an upper wall of the base body 2 and the lower wall of the bottom case 4 constitutes the lower wall of the base body 2. The front and rear walls 4a and 4b and right and left side walls 4c of the bottom case 4 and front and rear walls 5a and 5b and right and left side walls 5c of the top cover 5 constitute the peripheral wall of the base body 2.

The display housing 3 comprises a front panel 9 and a rear panel 10. A flat liquid crystal display device 11 is mounted in the display housing 3. A window 9a is provided in the front panel 9. A display screen of the liquid crystal display device 11 is exposed at the window 9a of the front panel 9. The display housing 3 has a pair of leg sections 12, 13. The leg sections 12 and 13 of the display housing 3 are fitted into the connecting section 7 and 8 of the top cover 5 and swingably connected to the connecting section 7 and 8. By this swinging connection, the display housing 3 is rotatable or swingable between a closed position where the keyboard 6 is covered and an open position where the keyboard 6 is exposed. When the display housing 3 is in the closed position where the keyboard 6 is covered, the rear panel 10 is flush with the surface of upper wall 5d of the top cover 5. A recess 14 is provided at the front wall 5a of the base body 2 and a hook 15 is provided at the front surface of the display housing 3 and has elasticity. With the display housing placed in the closed position, the hook 15 is latched to the recess 14 to fix the display housing 3 in place.

The liquid crystal display device 12 is connected to the circuit board by lead-in wires, not shown.

Figure 7:
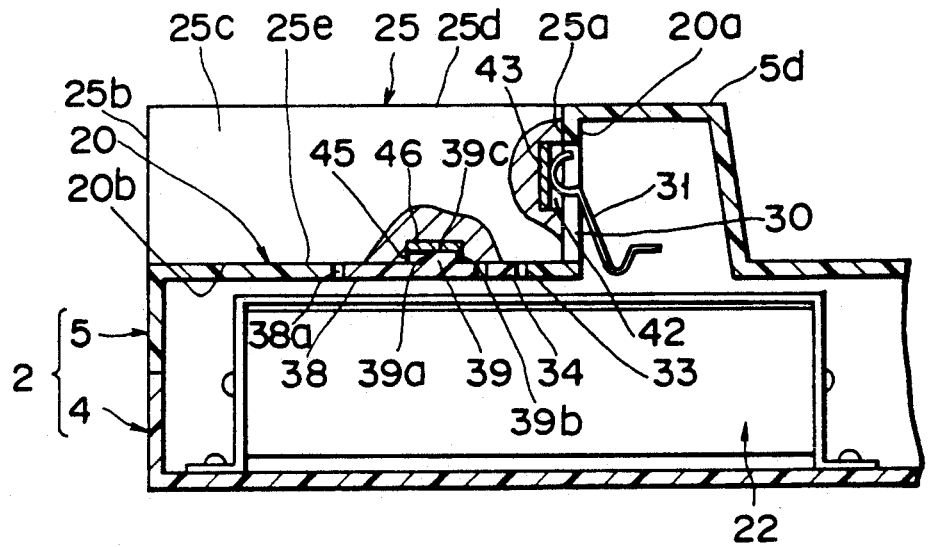
FIG. 7 is a side view showing a combination of an engaging member in the base body with an associated engaging section of the battery pack.
Figure 8:
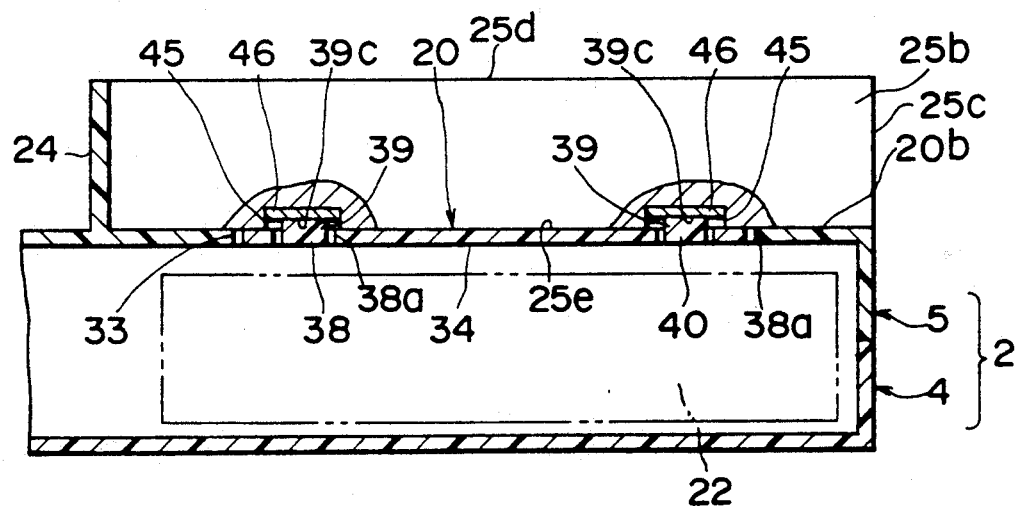
FIG. 8 is a rear-side view showing a combination of an engaging member in the base body with the associated engaging section of the battery pack.

As shown in FIGS. 2 to 5, first and second battery pack storage areas 20 and 21 are arranged in a lateral right/left array in the back portion 5B of the top cover 5 of the base body 2. As shown in FIGS. 2, 7 and 8, a floppy disc driving device 22 is provided in the rear portion of the bottom case 4 of the base body 2 such that it is located below the first battery pack storage area 20. The floppy disc driving device 22 includes a device for rotationally driving the floppy disc and a magnetic head for recording and playing back information on and from the floppy disc. The floppy disc driving device 22 has an access opening section 23 for loading and unloading the floppy disc. The floppy disc access opening section 23 is provided in the side wall of the base body 2.

Figure 3:
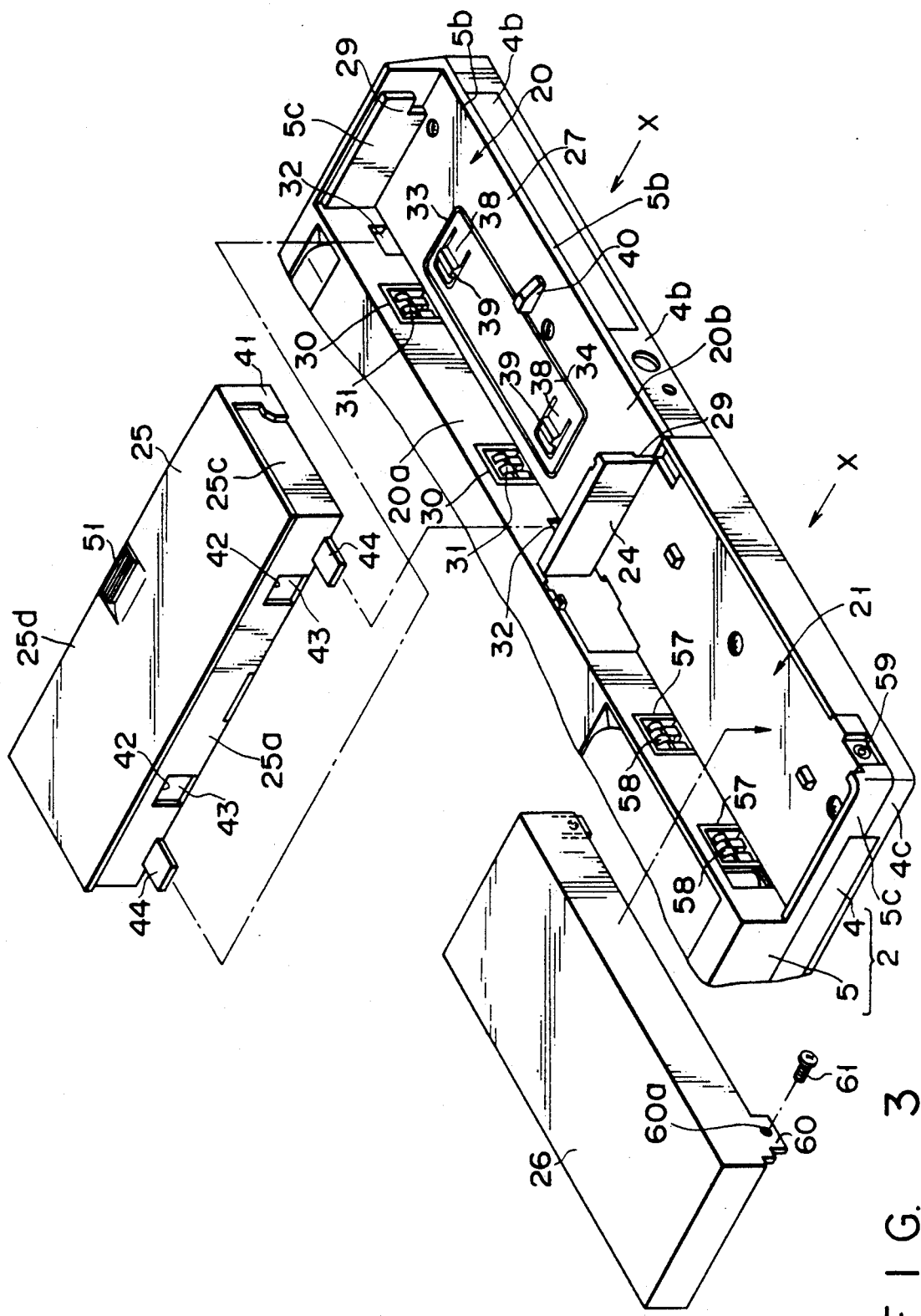
FIG. 3 is a perspective, exploded view showing a battery pack storage area in the base body and a pair of battery packs.
Figure 4:
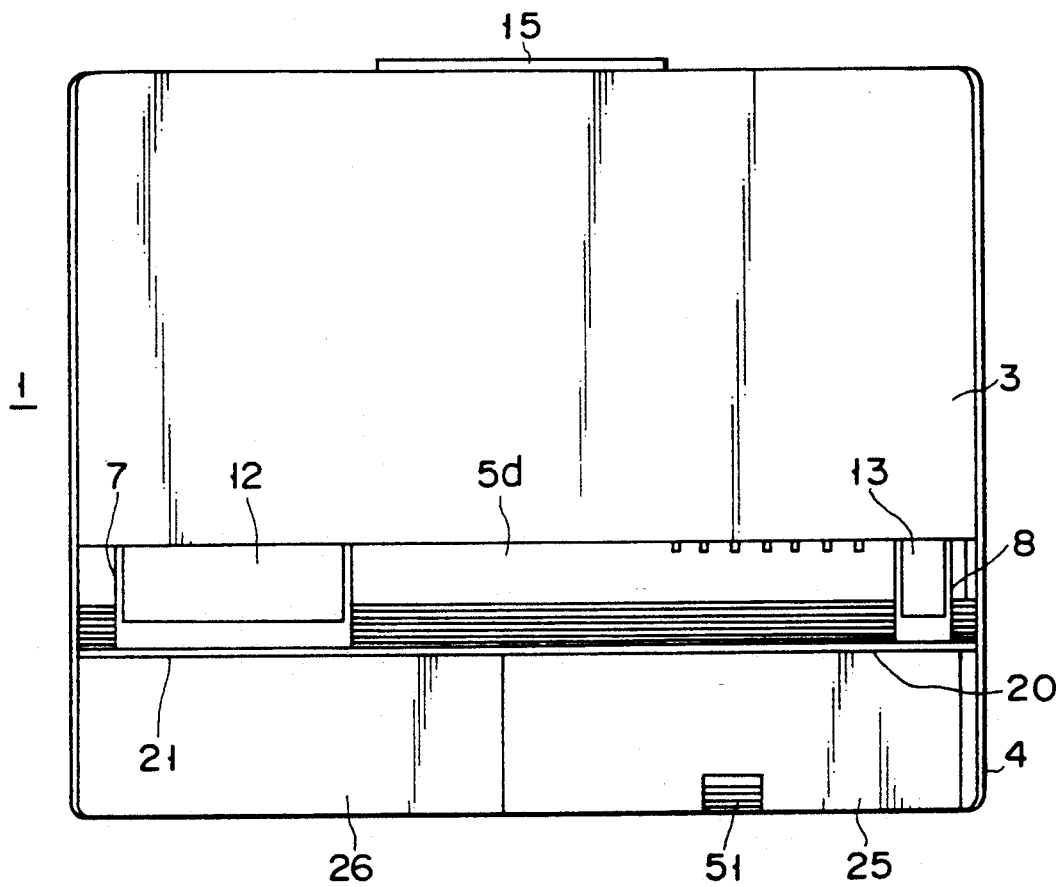
FIG. 4 is a top view of the portable computer.
Figure 5:
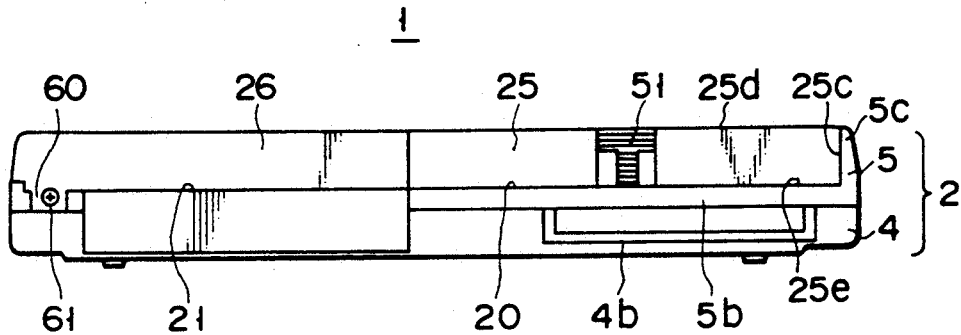
FIG. 5 is a rear view of the portable computer.

As shown in FIG. 3, the first and second battery pack storage areas 20 and 21 define right and left elongated spacings and are opened at the upper wall 5d of the top cover 5. A partition wall 24 is provided, in a front/back direction, on the top cover 5 at an area between the first and second battery pack storage areas 20 and 21. The first and second battery pack storage areas 20 and 21 are divided by the partition wall 24.

First and second battery packs 25 and 26 are detachably loaded in the first and second battery pack storage areas 20 and 21, respectively, and have a rectangular configuration each conforming to that of the respective battery pack storage area 20, 21. The first and second battery packs 25 and 26 have recharging batteries incorporated therein and are employed as a power supply for driving the portable computer 1.

The first battery pack storage area 20 and first battery pack 25 incorporated therein will be explained in more detail below.

Firstly, the first battery pack storage area 20 will be explained below.

As shown in FIG. 3, the first battery pack storage area 20 is defined by a front wall 20a, a lower wall 20b merging with the front wall 20a, side wall 5c of the top cover 5 and the partition wall 24 to provide a rectangular box-like spacing. Peripheral wall is defined by the front wall 20a, side wall 5c of the top cover 5 and partition wall 24. The rear portion of the first battery pack storage area 20 is opened at the rear wall 5b of the top cover 5 to provide a battery pack access opening section 27.

The access opening section 27 extends from the rear wall 5b of the top cover 5 toward the upper wall 5d of the top cover 5 to provide an added access opening section for a battery pack.

A pair of hold members 29 are oppositely provided on the opposite side walls of the first battery pack storage area 20, that is, on the side wall 5c of the top cover 5 and the inner surface of the partition wall 24. The respective hold members 29 are cut at their lower half portions to provide a stepped recess. A pair of holes 30 are provided, at a given interval, at the frontwall 20a of the first battery pack storage area 20. The holes 30 allow communication between the inside and outside of the first battery pack storage area 20.

Figure 9:
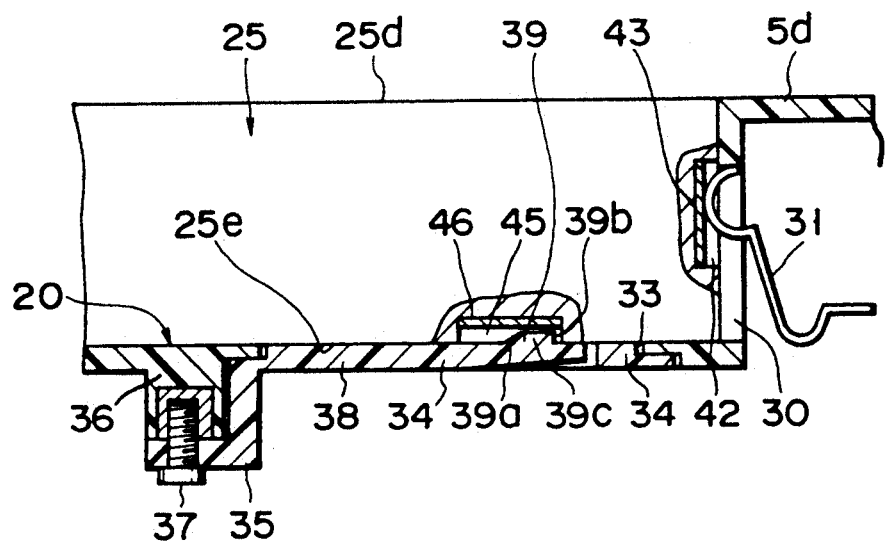
FIG. 9 is a side view showing a combination of the engaging member in the base body with the engaging section of the battery pack.
Figure 10:
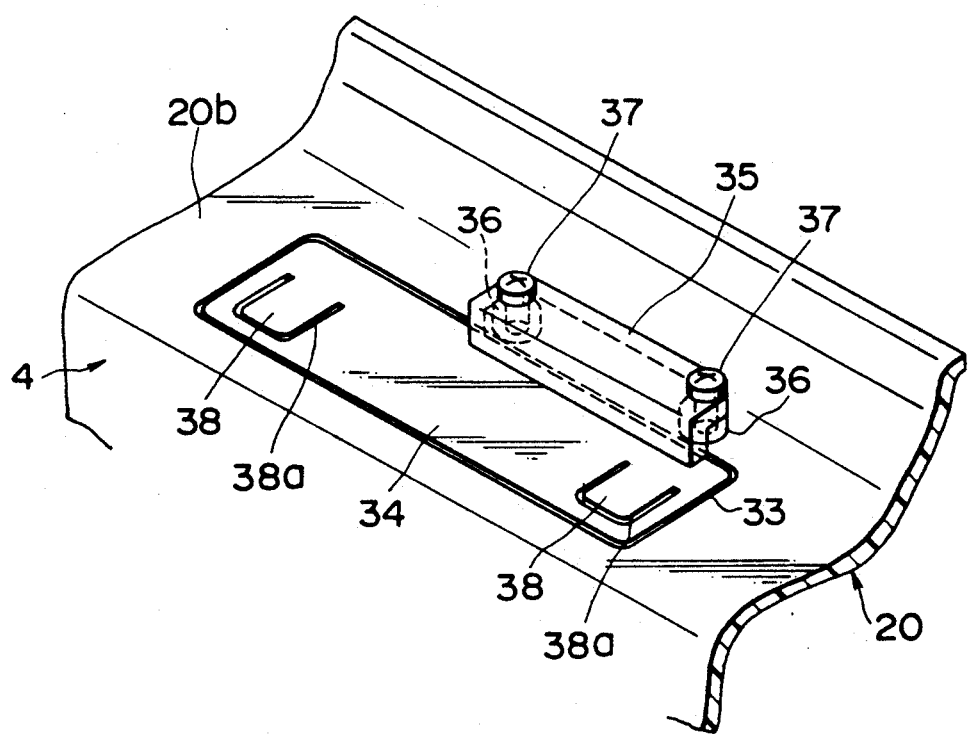
FIG. 10 is a perspective view showing a plate member in a battery pack storage area as viewed from below.

As shown in FIGS. 3, 7 and 9, a pair of elastic contacts 31 are disposed inside the top cover 5 in an opposed relation to the holes 30 and formed of an elastic, electrically conductive plate.

The elastic contacts 31 are attached to the circuit board, not shown, held in the base body 2. One end of the respective elastic contact 31 is attached to the circuit board and electrically connected to an associated circuit on the circuit board. The other end of the elastic contact 31 enters the respective contact hole 30 in the front wall 20a of the first battery pack storage area 20 and is projected into the first battery pack storage area 20. The respective contact 31 is elastically deformable in a front/back direction of the first battery pack storage area 20.

A pair of through holes 32 are provided in the front wall 20a of the first battery pack storage area at a greater interval than at the given interval as set out in connection with the pair of contact holes 30. The through holes 32 allow communication between the inside and outside of the first battery pack storage area 20.

As shown in FIGS. 3 and 7 to 10, a hole 33 is formed, in a lateral left/right direction, in the lower wall 20b of the first battery pack storage area 20 and a plate member 34 is located at the hole 33. The plate member 34 is made of, for example, synthetic resin and has the same size as the hole 33. A mounting section 35 is provided on the lower surface of the plate member 34 and abuts against a pair of bosses 36 formed on the lower surface of the lower wall 20b of the first battery pack storage area 20. The plate member 34 is fixed to the first battery pack storage area 20 by threadably inserting screws 37 into the mounting section 35 and bosses 36.

A pair of tongues 38 are provided in the plate member 34 and serve as engaging sections. The tongues 38 are located at a given interval corresponding to the contact holes 30 in the front wall 20a of the first battery pack storage area 20. The respective tongue 38 is provided with a cutout line 38a in the plate member 34 such that it is formed in a front/back direction. The tongue 38 has a rear end continuous with the plate member 34 and a remaining U-cut area which, together with the rear end, exhibits resiliency in the up/down direction as a whole. A projection 39 is provided on the upper surface of each of the respective tongues 38 and each rear portion of the projection 39 is forwardly upwardly inclined as in inclined surface 39a and the front surface of the projection 39 provides a vertical surface 39b. A top portion between the inclined surface 39a and vertical surface 39b provides a middle horizontal surface 39c.

The plate member 34 is provided flush with the bottom wall 20b of the battery pack storage area 20 and the tongue 38 is provided flush with the plate member 34 and constitutes part of the lower wall 20b of the first battery pack storage area 20. This specific arrangement obviates the necessity to provide any extra tongue 38 occupation area below the lower wall 20b of the first battery pack storage area 20. Therefore, the floppy disc driving device 22 can be located at a spacing below the first battery pack storage area 20 without thickening the base body 2.

As shown in FIGS. 3 and 11, a projection 40 is upwardly provided at the center of the lower wall 20 of the first battery pack storage area 20. A forwardly upwardly inclined surface 40a is provided at the rear side of the projection 40 and a vertical surface 40b is provided at the forward side of the projection 40. A horizontal surface 40c is provided at a middle area between the inclined surface 40a and the vertical surface 40b of the projection 40.

The first battery pack 25 will be explained below.

As shown in FIGS. 3 to 9, a first battery pack 25 has a rectangular configuration conforming to the first battery pack area 20 and has a front wall 25a, a rear wall 25b, right and left side walls 25c, a top wall 25d and a lower wall 25e. The peripheral wall of the first battery pack is defined by the front wall 25a, rear wall 25b and right and left side walls 25c.

A pair of mating areas 41 are provided at the rear portions of the right and left side walls 25c of the first battery pack 25 such that they project from the side walls 25c of the first battery pack 25 with the upper half end portion of the mating area cut off. That is, the respective mating area 41 of the first battery pack 25 matingly engages with the hold member 29 of the first battery pack storage area 20 in an up/down direction. When the first battery pack 25 is received in the first battery pack storage area 20, the mating area 41 is held down from above with the hold member 29.

A pair of square recesses 42 for electrodes are provided in the front wall 25d of the first battery pack 25 and arranged at such a given interval as to face the corresponding contacts 31 in the contact holes 30 of the first battery pack storage area 20 with electrodes 43 provided each in the respective area 20. The respective electrodes 43 are electrically connected to associated batteries in the first battery pack area 20.

A pair of projection pieces 44 are provided at the front wall 25a of the first battery pack 25 such that each faces a corresponding one of the pair of through holes 32 of the first battery pack storage area 25. The projection piece 44 projects forwardly from the front wall 25a of the first battery pack 25.

Figure 6:
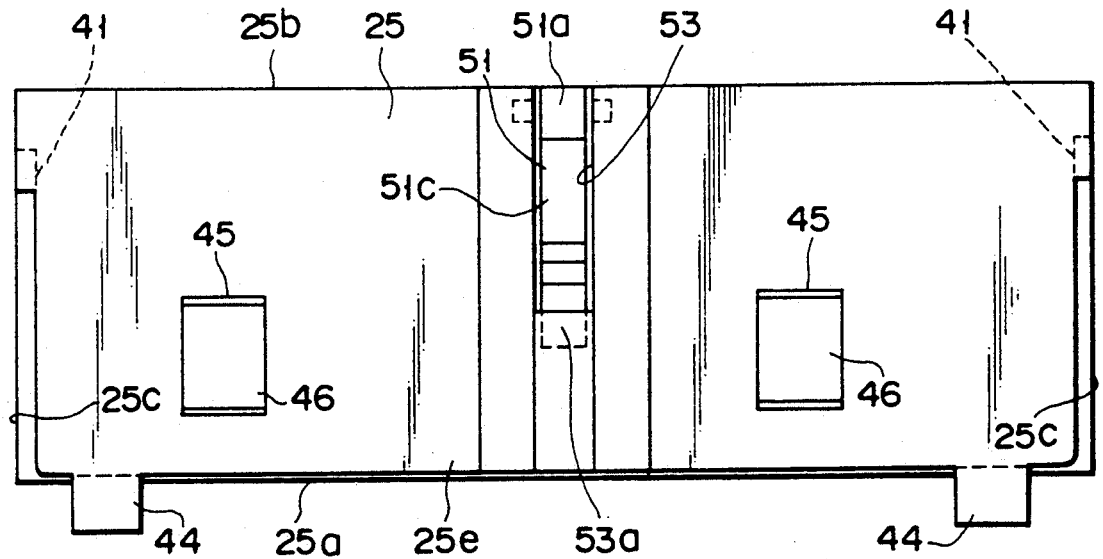
FIG. 6 is a view showing a rear side of a battery pack.

As shown in FIGS. 3 and 6, a pair of square recesses 45 are provided in a lower wall 25e of the first battery pack 25 and located at an interval in a manner to face the projections 39 of the tongues 39 of the plate member 34. Electrodes 46 are provided in the recesses 45 and electrically connected to the corresponding battery of the first battery pack 25.

Those contacts having the same function as contacts 31 are sometimes provided at the bottom wall 20b of the first battery pack storage area 20 and can be placed in contact with the electrodes 46 in the recesses 45.

As shown in FIGS. 3, 6 and 11, a crank 51 and spring 52 for urging the crank 51 are provided at the middle of the first battery pack 25. The crank 51 is L-like in configuration and has an axial section 51a serving as a rotation shaft. The axial section 51a is rotatably held on the first battery pack 25 in a horizontal direction to allow the crank 51 to rotate in a direction indicated by arrows in FIG. 11. One end portion 51b of the crank 51 leads to the upper wall 25d from the rear wall 25b of the first battery pack 25. A hook portion 51d is provided at the other end portion 51c of the crank 51 and latched to the projection 40 of the first battery pack storage area 20.

A twisted coil spring is employed as the spring 52 and held in place as at a pin 52a in the first battery pack 25. One end portion of the spring 52 makes contact with the inner surface of the upper wall 25d of the first battery pack 25 and the other end portion of the spring 52 makes contact with the upper surface of the other end portion 51c of the crank 51. The spring 52 imparts a downward urging force to the other end portion 51c of the crank 51. An opening 53 is provided in the bottom wall 25e of the first battery pack 25 to expose said other end portion 51c of the crank 51. The aforementioned other end portion 51c of the crank 51 is pressed by the spring 52 against an edge 53a of the opening 53 so that the crank 51 has its downward rotation restricted.

The crank 51 and spring 52, as well as the projection 40 of the first battery pack storage area 20, provide a means for holding the first battery pack 25 in the first battery pack storage area 20.

Holding the first battery pack 25 in the first battery pack storage area 20 will be explained below.

First, the first battery pack 25 is inserted, in a direction of x in FIG. 3, from behind the base body 2 toward the front wall of the first battery pack 25 through the opening section 27 of the first battery pack storage area 20, that is, stored in the first battery pack storage area 20.

With the insertion of the first battery pack 25 into the first battery pack storage area 20, the lower wall 25e of the first battery pack 25 slides on the lower wall 20b of the first battery pack storage area 20 and, at the same time, the side walls 25c of the first battery pack 25 slides on the partition wall 24 of the first battery pack storage area 20 and side wall 5c of the top cover 5. Upon abutting of the front wall 25a of the first battery pack 25 against the front wall 20a of the first battery pack storage area 20, the first battery pack 25 is stopped from being further moved, completing the storage of the first battery pack 25.

Upon insertion of the first battery pack 25 into the first battery pack storage area 20, the respective recesses in the lower wall 25e of the first battery pack 25 are engaged with the projections 39 of the tongues 38 on the plate member 34 of the first battery pack storage area 20, as will be explained below.

Upon insertion of the first battery pack 25 into the first battery pack storage area 20, the forward edges of the recesses 45 of the first battery pack 25 reaches the horizontal surfaces 39c past the inclined surfaces 39a of the projections 39 of the tongues 38 of the first battery pack storage area 20. The tongues 39 are downwardly pushed by the lower wall 25e of the first battery pack 25 and elastically deformed, allowing the first battery pack 25 to advance in the first battery pack storage area 20. Upon movement of the leading edges of the recesses 45 clear of the horizontal surfaces 39c of the projections 39, the tongues 38 are upwardly elastically deformed back to the original position. As a result, the projections 39 of the tongues 38 are fitted in the associated recesses 45 with the forward portions of the inner wall surfaces of the recesses 45 contacting with the vertical surfaces 39b of the projections 39. By so doing, the first battery pack 25 in the first battery pack storage area 20 is prevented from being moved toward the rear side of the base body 2 and from slipping out of the first battery storage area 20.

The height of the projection 39 of the tongue 38 is determined by the following condition.

First, the projection 39 slightly engages with the recess 45 to an extent that the first battery pack 25 can be inhibited from slipping out of the first battery pack storage area 20.

Secondly, when the first battery pack 25 is outwardly drawn out of the first battery pack storage area 20, the disengagement of the projection 39 from the recess 45 is achieved, thus withdrawing the first battery pack 25 out of the first battery pack storage area 20.

The engagement of the crank (holding means) 51 with the projection 40 of the first battery pack storage area 20 when the first battery pack 25 is inserted into the first battery pack storage area 20 will be explained below.

When the first battery pack 25 is inserted into the first battery pack storage area 20, the end portion 51c of the crank 51 in the first battery pack 25 is moved on the inclined surface 40a of the projection 40 of the first battery pack storage area 20 and rides on the horizontal surface 40c of the projection 40. The end portion 51c of the crank 51 is rotated upwardly against the urging force of the spring 52 with the held pin 51a as a center, allowing the first battery pack 25 to further advance into the first battery pack storage area 20. When the end portion 51c of the crank 51 is moved clear of the horizontal surface 40c of the projection 40, it is rotated downwardly under the influence of the spring 52 so that the hook portion 51d of the end portion 51c is latched to the vertical surface 40b of the projection 40. This prevents the first battery pack 25 in the first battery pack storage area 20 from being moved toward the rear side of the base body 2.

When the first battery pack 25 is held in place in the first battery pack storage area 20, the stepped mating area 41 on the first battery pack 25 mates with the hold member 29, that is, the hold member 29 pushes the underlying mating area downwardly. For this reason, the first battery pack 25 is prevented from upwardly slipping out of the opening 27 of the first battery pack storage area 20.

The projections 44 provided on the first battery pack 25 extend out from the first battery pack storage area 20 through the associated through holes 32 in the first battery pack storage area 20, positioning the first battery pack 25 in the right/left direction.

The respective electrode provided in the recess 42 in the front wall 25a of the first battery pack 25 makes contact with the contact 31 in the contact hole 30 in the front wall 20a of the first battery pack storage area 20. The contact 31 makes contact with the respective electrode 43 under a resiliency force, electrically connecting the first battery pack 25 with the circuit board in the base body 2. The respective contact 31 is so located as to push out the first battery pack 25 toward the rear side of the battery pack storage area 20.

Since the respective contact 31 is projected through respective hole 30 into the first battery pack storage area 20, the respective contact 31 can be provided outside the front wall 20a of the first battery pack storage area 20. In this case, it provides a wider spacing in the first battery pack storage area 20. The contact 31 is received in the recess 42 of the first battery pack 25 and hence stably makes contact with the electrode 43 without being displaced in the right/left direction.

As shown in FIGS. 2 to 5, when the first battery pack 25 is received in the first battery pack storage area 20, the outer surfaces of the top and rear surfaces 25d and 25b of the first battery pack 25 close the opening 27 of the first battery pack storage area 20. The outer surfaces of the top and rear walls 25d and 25b of the first battery pack 25 are flush with the upper and rear walls 5d and 5b of the top cover 5. When, therefore, the first battery pack 25 is received in the first battery pack storage area 20, the outer surface of the back portion 5B of the top cover 5 is made flat and hence the computer can be made flat as a whole.

The projections 44 of the first battery pack 25 allow the designing of the electric circuit which is provided in the base body 2 to be modified in accordance with the design of the first battery pack 25.

As shown in FIG. 12, a circuit board 54 is provided in the back portion 5B of the top cover 5. A contact element 55 is mounted on the circuit board 54 and has resilience. The contact element 55 is so provided as to correspond to each or one of the paired through holes 32 in the front wall 20a of the first battery pack storage area 20. The contact element 55 has one end portion fixedly connected to a corresponding circuit component on the circuit board 54 and the other end portion of the contact element 55 is movable into and out of engagement with a corresponding contact 56 on the circuit of the circuit board 54. The contact element 55 is normally away from the contact 56. The circuit of the circuit board 54 is, for example, out of engagement with the contact 56 when a current of 1700 mA is involved and placed in engagement with the contact 56 when a current of 2000 mA is involved. The first battery pack 25 differs in current value depending upon its capacitance, that is, several first battery packs 25 can be interchangeably used. Also the length of the projection piece 44 of the first battery pack 25 differs depending upon the level of a current in the first battery pack 25. For example, the greater the current, the longer the projection piece 44.

Let it be assumed that the level of a current in one of the first battery packs 25 is 2000 mA. In this case, the first battery pack 25 is received in the first battery pack storage area 20 with the projection piece 44 projected out of the first battery pack storage area 20 through the through hole 32. At this time, the projection piece 44 pushes the contact element 55 into engagement with the contact 56 on the circuit board 54 and the circuit of the circuit board 54 is switched to a different mode. However, because a first battery pack 25 having a current of 1700 mA has a shorter projection piece 44, the projection piece 44 does not push the contact element into engagement with the contact 56 and the circuit of the circuit board 54 is not switched to a different mode.

The detachment of the first battery pack 25 from the first battery pack storage area 20 will be explained below.

In use, the crank 51 of the first battery pack 25 is rotated in a Y direction to allow the hook portion 51d on the end portion 51c of the crank 51 to be unlatched from the projection 40 of the first battery pack storage area 20. By so doing it is possible to disengage the first battery pack 25 from the first battery pack storage area 20.

The recess 45 of the first battery pack 25 is engaged with the projection 39 of the tongue 38 of the first battery pack storage area 20. For this reason, the first battery pack 25 is blocked from being moved toward the opening section 27 of the first battery pack storage area 20. The force tending to push out the first battery pack 25 is applied to respective contacts 31 provided in the first battery pack storage area 20. In this state, the first battery pack 25 is not moved toward the opening section 27 of the first battery pack storage area 20. It is possible to prevent the first battery pack 25 from dropping out of the opening section 27 of the first battery pack storage area 20 after the first battery pack 25 has been disengaged by the holding means.

It has been impossible in the conventional apparatus to, when the holding of the first battery pack 25 by the holding means is released, hold the first battery pack 25 in the first battery pack storage area 20. Therefore, the first battery pack 25 has slipped, by the force of the contact 31, out of the opening section 27 of the first battery pack storage area 20, so that it is damaged.

According to the present invention, the first battery pack 25 is stopped from being moved after the holding of the first battery pack 25 by the holding means has been achieved. It is, therefore, possible to safely and reliably treat the first battery pack 25. That is, even if a force tending to push out the first battery pack 25 acts thereon with the contacts 31 provided in the front wall 20a of the first battery pack storage area 20, it is possible, according to the present invention, to prevent an inadvertent slippage of the first battery pack 25 out of the first battery pack storage area 20. It is, therefore, possible to provide the contacts 31 in the front wall 20a of the first battery pack storage area 20 without providing a spacing below the lower surface 20b of the first battery pack storage area 20 for that purpose. For this reason, the floppy disc driving device 22 alone can be mounted in a spacing beneath the first battery pack storage area 20 and the base body 2 can be made thinner than in the case where both the floppy disc driving device 22 and contacts 31 are provided in a spacing below the first battery pack storage area 20.

When the first battery pack 25 is firmly withdrawn rearwardly with its rear portion somewhat upwardly tilted, the engagement of the projection 39 with the recess 45 is released, allowing the first battery pack 25 to be readily disengaged from the first battery storage area 20.

The contacts 31 may be provided not only in the front wall 20a of the first battery pack storage area 20 but also in the partition wall 24 and side wall 5c of the top cover 5.

The electrodes 43 and associated contacts 31 may be provided not only in the front portions of the first battery pack 25 and first battery pack storage area 20 but also in the side portions of the first battery pack 25 and first battery pack storage area 20.

In the aforementioned embodiment, the access opening section 27 for loading or unloading the first battery pack 25 into and out of the first battery pack storage area 20 are upwardly extended from the rear portion of the first battery pack storage area 20.

The access opening section provided in the first battery pack storage area 20 is not restricted to the rear wall of the peripheral wall of the base body 2. It can also be provided in the side portion of the peripheral wall of the base body 2.

The second battery pack 26 and second battery pack storage area 21 will be explained below.

The second battery pack 26 is held in the second battery pack storage area 21.

The second battery pack storage area 21 defines a rectangular box-like spacing with its upper and rear sides opened.

A pair of holes 57 are provided at a given interval in the side wall of the second battery pack storage area 21 as shown in FIG. 3. A corresponding pair of contacts 58 are disposed on the front side of a front wall of the second battery pack storage area 21. The contacts 58 face the inside of the second battery pack storage area 21 through the corresponding holes as set out above. A screw hole 59 is provided in the rear wall of the second battery pack storage area 21.

The second battery pack 26 is of a rectangular boxlike configuration corresponding in size to the second battery pack storage area 21. A pair of electrodes, not shown, are provided in the rear wall of the second battery pack 26 and arranged at places corresponding in position to the contacts 58 provided outside the front wall of the second battery pack storage area 21. A projection 60 is provided on the rear wall of the second battery pack 26 and has a screw hole 60a. The projection 60 is located in a position corresponding to the screw hole 59 in the second battery pack storage area 21.

The second battery pack 26 is held in the second battery pack storage area 21 with the respective electrodes of the second battery pack 26 in contact with the associated contacts 58 of the second battery pack storage area 21. A screw 61 is inserted into the screw hole 59 in the second battery pack storage area 20 and threadably tightened into the second battery pack 26 to fix the second battery pack 26 to the second battery pack storage area 21.

Although, in the aforementioned embodiment, the first and second battery packs 20 and 21 are provided in the base body 2, at least one first battery pack 20 may be provided there.

The present apparatus can be applied not only to the portable computer but also to other apparatus, such as a word processor and liquid crystal television set.

The present invention is not restricted to the aforementioned embodiment and various modifications and changes of the invention can be made without departing from the spirit and scope of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable electronic apparatus comprising:
   a battery pack having an engaging section;
   a base body comprising means for removably storing the battery pack when the battery pack is inserted therein, the storing means comprising means for engaging the engaging section of the battery pack when the batter back is inserted in the storing means; and
   latch means for releasably locking the battery pack in the storing means when the battery pack is inserted therein, the engaging means temporarily preventing the battery pack from exiting the storing means when the latch means is released, the latch means being independent of the engaging means and the engaging section and operating independent of the engaging means.

2. A portable electronic apparatus according to claim 1, wherein the engaging section has an indent therein and the engaging means comprises an engaging projection for removably engaging with the indent.

3. A portable electronic apparatus according to claim 2, wherein the engaging means comprises means elastically supporting the engaging projection.

4. A portable electronic apparatus according to claim 3, wherein the storing means further comprises a first surface having an opening therein, the engaging projection being disposed in the opening, and the battery pack comprises a second surface corresponding to the first surface, the second surface comprising the engaging section and the indent therein.

5. A portable electronic apparatus according to claim 4, wherein the battery pack further comprises a first electrical terminal disposed outside of the indent and the storing means further comprises a second electrical terminal separate from the engaging projection, the first electrical terminal electrically contacting the second electrical terminal when the battery pack is stored in the storing means.

6. A portable electronic apparatus according to claim 5, wherein the base body further comprises a lower portion and an upper portion, the storing means being disposed in the upper portion.

7. A portable electronic apparatus according to claim 6, wherein the latch means comprises a latch projection disposed at the first surface and a latch claw disposed at the battery pack, the latch claw being movable between a latch position for locking the battery pack in the storing means and a release position for releasing the battery pack from the storing means.

8. A portable computer, comprising:
   a base unit comprising a front portion having a keyboard and a rear portion having a base indent portion, the base indent portion having a plurality of first projections and a plurality of holes therein;
   a battery pack, removably stored in the base indent portion, comprising a plurality of second projections and a plurality of contact portions, each of the second projections being removably inserted into one of the holes; and
   latch means for releasably locking the battery pack in the base indent portion when the battery pack is stored in the base indent portion, the latch means being independent of the first projections and the contact portions, each of the contact portions cooperating independent of the latch means with one of the first projections to prevent the battery pack from falling off the base indent portion when the latch means releases the battery pack from the base indent portion.

9. A portable computer according to claim 8, wherein the base indent portion further comprises an inner bottom wall having a bottom opening therein, the first projections being disposed in the bottom opening.

10. A portable computer according to claim 9, wherein the base unit further comprises a cover plate covering the bottom opening, the cover plate comprising the first projections and a plurality of supporters, each of the supporters elastically supporting one of the first projections.

11. A portable computer according to claim 10, wherein the battery pack further comprises a bottom surface comprising the contact portions, each of the contact portions having an engaging indent, each of the first projections being stored in one of the engaging indents when the battery pack is removably stored in the base indent portion.

12. A portable computer according to claim 11, wherein each of the first projections includes a first front wall, each of the engaging indents includes a second front wall, each of the first front walls being positioned at a predetermined distance from a corresponding one of the second front walls of a corresponding one of the engaging indents when the latch means locks the battery pack in the base indent potion, and the latch means enabling said each of the first front walls to contact said corresponding one of the second front walls when the latch means releases the battery pack from the base indent portion.

13. A portable computer according to claim 12, wherein the battery pack further comprises a plurality of first electric terminals, the base indent portion further comprises a plurality of second electric terminals, each of the first electric terminals electrically contacting a corresponding one of the second electric terminals when the latch means locks the battery pack in the base indent portion.

14. A portable computer according to claim 13, wherein each of the first electric terminals is separate from each of the engaging indents, and each of the second electric terminals is separate from each of the first projections.

15. A portable computer according to claim 14, wherein the base indent portion further comprises an inner front wall, the holes and the second electric terminals being disposed at the inner front wall, and the battery pack further comprises a battery pack front wall, the second projections and the first electric terminals being disposed at the battery pack front wall.

16. A portable computer according to claim 15, wherein the latch means comprises a movable end portion for selectably moving between a latch position to lock the battery pack in the base indent portion and a release portion to release the battery pack from the base indent portion, and a hook portion.

17. A portable computer according to claim 16, wherein the latch means further comprises an engaging projection disposed at the inner bottom wall, the hook portion engaging the engaging projection when the moveable end portion is in the latch position, the moveable end portion being disposed at the bottom surface of the battery pack.

18. A portable electronic apparatus comprising:
a battery pack having a first surface including an engaging section having an indent therein and a first electrical terminal disposed outside of the indent;
a base body having a lower portion and an upper portion comprising means for removably storing the battery pack when the battery pack is inserted therein, the storing means comprising:
means for engaging the engaging section of the battery pack when the battery back is inserted in the storing means;
a second surface corresponding to the first surface having an opening therein, the engaging means comprising an engaging projection disposed in the opening for removably engaging with the indent and means elastically supporting the engaging projection; and
a second electrical terminal separate from the engaging projection, the first electrical terminal electrically contacting the second electrical terminal when the battery pack is stored in the storing means; and
latch means for releasably locking the battery pack in the storing means when the battery pack is inserted therein comprising a latch projection disposed at the first surface and a latch claw disposed at the battery pack, the latch claw being movable between a latch position for locking the battery pack in the storing means and a release position for releasing the battery pack from the storing means, the engaging means temporarily preventing the battery pack from exiting the storing means when the latch means is released.

19. A portable computer, comprising:
a base unit comprising a front portion having a keyboard and a rear portion having a base indent portion, the base indent portion having a plurality of holes therein, an inner bottom wall having a bottom opening therein, and a cover plate covering the bottom opening, the cover plate comprising first projections disposed in the bottom opening and a plurality of supporters, each of the supporters elastically supporting one of the first projections;
a battery pack, removably stored in the base indent portion, comprising a plurality of second projections and a bottom surface comprising a plurality of contact portions, each of the second projections being removably inserted into one of the holes, each of the contact portions having an engaging indent, each of the first projections being stored in one of the engaging indents when the battery pack is removably stored in the base indent portion; and
latch means for releasably locking the battery pack in the base indent portion when the battery pack is stored in the base indent portion, the latch means being separate from the first projections and the contact portions, each of the contact portions cooperating with one of the first projections to prevent the battery pack from falling off the base indent portion when the latch means releases the battery pack from the base indent portion.

20. A portable computer according to claim 19, wherein each of the first projections includes a first front wall, each of the engaging indents includes a second front wall, each of the first front walls being positioned at a predetermined distance from a corresponding one of the second front walls of a corresponding one of the engaging indents when the latch means locks the battery pack in the base indent portion, and the latch means enabling said each of the first front walls to contact said corresponding one of the second front walls when the latch means releases the battery pack from the base indent portion.

21. A portable computer according to claim 20, wherein the battery pack further comprises a plurality of first electric terminals, the base indent portion further comprises a plurality of second electric terminals, each of the first electric terminals electrically contacting a corresponding one of the second electrical terminals when the latch means locks the battery pack in the base indent portion.

22. A portable computer according to claim 21, wherein each of the first electric terminals is separate from each of the engaging indents, and each of the second electric terminals is separate from each of the first projections.

23. A portable computer according to claim 22, wherein the base indent portion further comprises an inner front wall, the holes and the second electric terminals being disposed at the inner front wall, and the battery pack further comprises a battery pack front wall, the second projections and the first electric terminals being disposed at the battery pack front wall.

24. A portable computer according to claim 23, wherein the latch means comprises a movable end portion for selectably moving between a latch position to lock the battery pack in the base indent portion and a release position to release the battery pack from the base indent portion, and a hook portion.

25. A portable computer according to claim 24, wherein the latch means further comprises an engaging projection disposed at the inner bottom wall, the hook portion engaging the engaging projection when the movable end portion is in the latch position, the movable end portion being disposed at the bottom surface of the battery pack.

* * * * *